United States Patent
Frees et al.

(10) Patent No.: US 6,577,463 B1
(45) Date of Patent: Jun. 10, 2003

(54) TANGENTIAL MISALIGNMENT PRECOMPENSATION IN A DIRECT ACCESS STORAGE DEVICE

(75) Inventors: Gregory Michael Frees, Los Altos, CA (US); Kirk Barrows Price, San Jose, CA (US); Louis Joseph Serrano, San Jose, CA (US); Mantle Man-Hon Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,253

(22) Filed: Apr. 27, 2000

(51) Int. Cl.[7] ............................. G11B 5/09; G11B 5/596
(52) U.S. Cl. ....................................... 360/51; 360/77.08
(58) Field of Search ............................. 360/51, 77.08, 360/49, 77.04, 25, 31, 75

(56) References Cited

U.S. PATENT DOCUMENTS

| | | | |
|---|---|---|---|
| 4,458,037 A | 7/1984 | Leach ..................... | 360/77.04 |
| 4,931,888 A | 6/1990 | Taguchi et al. .......... | 360/77.04 |
| 5,241,433 A | 8/1993 | Anderson et al. ........ | 360/77.04 |
| 5,523,901 A * | 6/1996 | Anderson et al. ........ | 360/77.08 |
| 5,771,131 A | 6/1998 | Pirzadeh .................. | 360/77.08 |
| 5,854,722 A | 12/1998 | Cunningham et al. ... | 360/77.04 |
| 6,167,008 A * | 12/2000 | Kuribayashi ............. | 369/44.32 |

* cited by examiner

Primary Examiner—Regina N. Holder
(74) Attorney, Agent, or Firm—Kunzler & Associates

(57) ABSTRACT

A system and method for precompensating for tangential misalignment in a direct access storage device adjusts a SID timing window individually for every track or surface of the direct access storage device. The system and method generate a calculation of the tangential misalignment and adjust, in accordance with the calculation of tangential misalignment, a timing window during which the transducer head reads the information located on the storage surface. The calculation of tangential misalignment may be the result of a direct measurement of the tangential misalignment, or may be converted from radial misalignment data. The adjustment of the timing window may comprise opening the timing window an amount depending upon the degree of misalignment of each track, and may comprise shifting the window in time either forward or backward depending upon the nature of the calculated misalignment.

30 Claims, 9 Drawing Sheets

TANGENTIAL MISALIGNMENT PRECOMPENSATION IN A DIRECT ACCESS STORAGE DEVICE

BACKGROUND OF THE INVENTION

1. The Field of the Invention

The present invention relates to servo algorithms for direct access storage drives. More specifically, the present invention relates to an improved servo algorithm for tangential misalignment precompensation in a direct access storage drive.

2. The Relevant Technology

Computer systems generally utilize auxiliary memory storage devices having media on which data can be written and from which data can be read for later use. A direct access storage device (DASD), such as a hard disk drive, incorporating rotating magnetic disks is commonly used for storing data in magnetic form on concentric, radially spaced tracks on the disk surfaces. Transducer heads driven in a path generally perpendicular to the drive axis are used to write data to the disks and read data from the disks.

DASD systems require a method to position each data head over the proper radial location for writing a track and for returning the data head very close to the same location when reading the track. With current DASD systems using a voice coil type of actuator, a control device with a feedback response is provided to locate and stably hold the head on a given track. Typically, track accessing (seeking) and track following (tracking) are enabled by magnetically written patterns on the disk surface. The patterns generally take the form of prerecorded tracking servo identification (SID) marks. The servo marks are read by the transducer head and transmitted to a control unit, which utilizes the servo marks to set and correct the position of the transducer head.

Several different basic servo schemes exist. A dedicated servo system reserves a dedicated surface of one of the disks in the DASD and records servo marks and other access information thereon. A sector servo system uses small portions of tracks between sectors of each track of each data surface to provide the servo mark and access information. A hybrid servo system uses both to obtain advantages of each type.

One problem all servo tracking systems must deal with is misalignment of the tracks after the servo marks have been placed on the disk surfaces. This misalignment results in a difference in an actual location of data written to a disk surface from the expected location as marked by the servo marks. Track misalignment generally arises from occurrences such as thermal differences between components, which causes nonuniform expansion or contraction of the components, slippage of the disks on the spindle which connects the disks, and shock inputs to the DASD unit. The shocks can result in "spindle tilt," a relative tilting of the spindle on which the disks are aligned from an original axis.

These events result in two types of misalignment of the tracks relative to the servo marks. Misalignment that repeats is known as sinusoidal or "AC" misalignment, because it is manifested as a repeating sinusoidal signal with a fundamental frequency equal to the speed of rotation of the disk. Misalignment that is constant along the entire track is often referred to as "DC" misalignment.

The misalignment is referenced in two directions relative to the transducer head. Misalignment occurring in a direction parallel to the direction of movement of the transducer head relative to the spindle is known as "radial misalignment" or "track misregistration" (TMR). Misalignment in a direction perpendicular to the direction of movement of the transducer head relative to the spindle is referred to herein as "tangential misalignment," and results in errors in timing of the servo identification (SID) marks or signals.

Relatively slight misalignments are generally dealt with by the servo system using the position information from SID marks themselves. Nevertheless, more significant misalignments can occur that are outside the abilities of the head positioning servo system to compensate. Additionally, in order to quickly access the data tracks, the control unit may access information stored in memory regarding the location of the data tracks and generally, the location of the SID marks.

The prior art deals with the track misalignment in different manners in the radial and tangential directions. Radial misalignment, or repeatable radial offset (RRO), is currently precompensated for in certain instances with RRO feedforward and servo attenuation. Generally, this involves measuring the offset in the radial direction of the actual location of the SID marks from the expected location and storing the repeatable component of the offset in an RRO table. This offset is then fed by the control unit to the motor as a position error signal (PES), which supplements the servo control signals and corrects the positioning of the transducer head over the data tracks.

In the current art, there is no precompensation scheme for SID timing errors which occur from tangential misalignment. Instead, the art uses a technique of widening the opening of a SID timing window until the SID marks can be read. Under this arrangement, when disk shift has occurred, the SID marks do not appear when expected. The SID marks are written, as mentioned, between the sectors, (e.g., 96 times per track) with the data stored between the SID marks. When a SID mark does not appear where expected, the control unit opens the SID timing window in which the transducer head looks for the signal wider and wider until the SID mark appears. The default width for the SID timing window is selected to accommodate the expected range of tangential shifts of the SIDs for the entire DASD production run.

This arrangement has been found by the inventors to be increasingly problematic as recording densities increase. For instance, when the SID timing window is opened too wide, data in the data portion of the track is sometimes read and mistaken, due to a particular data arrangement, for the SID marks. This causes an error condition in the DASD, and sends the DASD into an error recovery mode, which significantly slows down the operation of the DASD. Widening the SID timing window for an entire production run of DASDs is also problematic, because so doing decreases the performance of the DASDs. Thus, a need exists in the art for overcoming problems that exist as a result of SID timing errors in higher density DASDs.

OBJECTS AND BRIEF SUMMARY OF THE INVENTION

The apparatus of the present invention has been developed in response to the present state of the art, and in particular, in response to the problems and needs in the art that have not yet been fully solved by currently available servo systems in direct access storage devices. Thus, it is an overall objective of the present invention to provide a DASD servo system which precompensates for tangential misalignment and thereby avoids SID timing errors.

To achieve the foregoing object, and in accordance with the invention as embodied and broadly described herein in the preferred embodiments, a system and method for tangential misalignment precompensation is provided.

The method of precompensating for tangential misalignment generally comprises calculating tangential misalignment of the head with respect to the information located on the storage surface, and adjusting, in accordance with the calculation of tangential misalignment, a timing window during which the head reads the information located on the storage surface.

Both periodic (AC) and/or constant (DC) components of tangential disk shift can be calculated and compensated for, though AC disk shift is more common. When calculating AC tangential disk shift, the shift for a single track can be calculated and converted for other tracks.

In one embodiment, generating the calculation of tangential misalignment comprises converting a radial misregistration measurement into the tangential misalignment calculation. The calculation of tangential misalignment may be generated using an equation comprising:

$$TMS(r, TMR, t) = \left(\frac{TMR(t - T/4)}{2\pi r}\right)T \quad \text{(Equation 1)}$$

Where TMR is the measured radial shift, t is the time at which the measurement is taken, T is the period of rotation, and r is the nominal radius of the track.

In a further embodiment, generating a calculation of tangential misalignment comprises directly measuring the tangential misalignment. Measuring the tangential misalignment may comprise measuring a difference between the time of a predicted occurrence of sensing the information located on the storage surface and the time of an actual occurrence of sensing the information located on the storage surface.

Adjusting the timing window in one embodiment comprises widening the timing window to accommodate tangential misalignment of the direct access storage device. In a further embodiment, adjusting the timing window comprises shifting the timing window in time to accommodate tangential misalignment of the direct access storage device. Preferably, the data stored on the storage surface comprises servo identification (SID) signals placed on the storage surface during manufacture of the direct access storage drive for locating the head in a desired location during read and write operations.

The tangential misregistration precompensation may be conducted on the fly for each track, but more preferably is conducted periodically for one track on each storage surface. Once the adjustments for one track are calculated, the proper adjustments for each other track on the surface can be computed therefrom using geometry and the respective radiuses of each track.

The method of precompensation for radial misalignment may be conducted by a servo system of a direct access storage drive (DASD). In one embodiment, the servo system comprises a magnetic recording disk provided with magnetically recorded data stored thereon and servo identification (SID) marks stored thereon identifying the locations in which the magnetically recorded data are stored, and a computer algorithm that uses the position information obtained from the SIDs to compensate for the apparent motion of the data tracks.

The DASD in which the servo system of the present invention is incorporated may also comprise a transducer head for reading and writing magnetically recorded stored on the magnetic recording disk and an actuator for moving the transducer head across the magnetic recording disk to access different regions of the magnetically recorded data on the magnetic recording disk. Additionally, the DASD may comprise a detector electrically coupled to the transducer head for detecting the magnetically recorded data.

A servo control unit is also preferably utilized within the DASD and in one embodiment comprises a tangential misalignment calculation module configured to generate a calculation of tangential misalignment of the head with respect to the information located on the storage surface. The servo control unit also preferably comprises a timing window adjustment module configured to receive the calculation of tangential misalignment and adjust, in accordance with the calculation of tangential misalignment, a timing window during which the head reads the SID information located on the disk surface.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
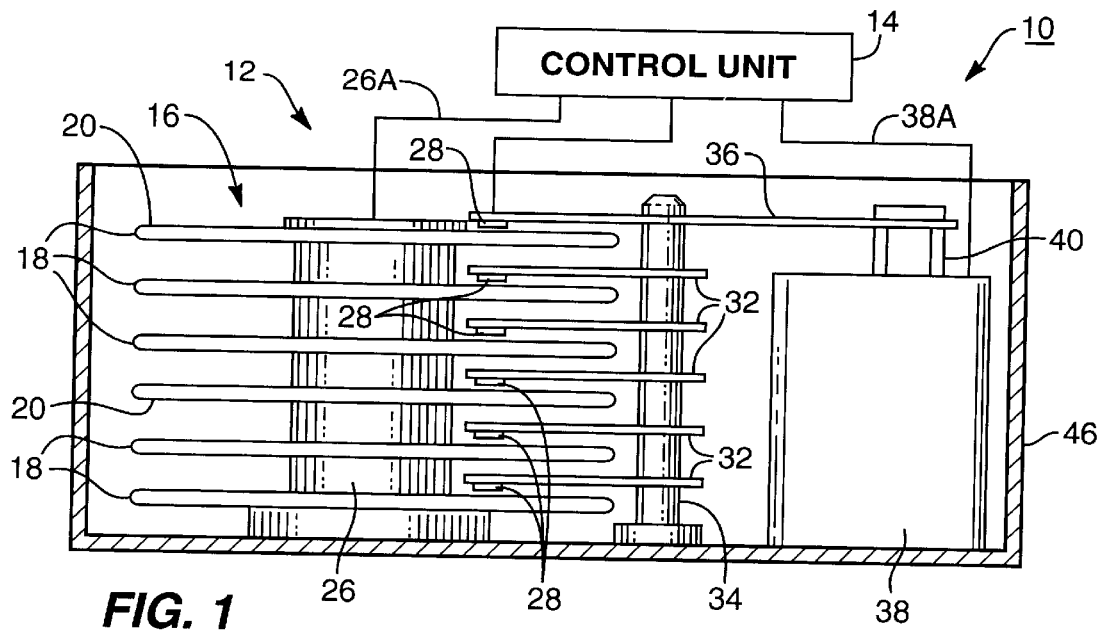
FIG. 1 is a partially schematic cross-sectional side view of one embodiment of a direct access storage device of the present invention.

FIG. 1 shows a partly schematic block diagram illustrating the basic components of a direct access storage system (DASD) in the form of a magnetic hard disk drive unit 10.

The disk drive unit 10 is shown including a data storage medium generally designated at 12 and a control unit generally designated at 14. The disk drive unit 10 is shown illustrated in a simplified form sufficient for an understanding of the present invention, and is only representative of the various types of DASDs which might employ the tangential misregistration precompensation system and method of the present invention.

The disk drive unit 10 includes a stack 16 of disks 18 each having at least one magnetic storage surface 20. The disks 18 are mounted in parallel for simultaneous rotation on and by an integrated spindle and motor assembly 26. Data stored on each disk 18 is read from and/or written to by a corresponding transducer head 28 movable across the disk surface 20.

The transducer heads 28 are mounted on flexure springs 30 carried by arms 32 collectively mounted for simultaneous pivotal movement about a support spindle 34. One of the arms 32 includes an extension 36 driven in a pivotal motion by a head drive motor 38. Although several drive arrangements are commonly used, the motor 38 may include a voice coil motor 40 cooperating with a magnet and core assembly (not shown) operatively controlled for moving the transducer heads 28 in synchronism in a radial direction in order to position the transducer heads 28 in registration with data tracks 42 (of FIG. 2) to be followed and to access particular data sectors 44 of the data tracks 42.

The disk drive unit 10 is shown as a modular unit enclosed within a housing 46. The various components of the disk drive unit 10 are controlled in operation by signals generated by the control unit 14, such as motor control signals on a line 26A and position control signals on a line 38A.

Numerous data tracks 42, each at a specific radial location, are arrayed in a concentric pattern in the magnetic medium of each disk surface 20 of data disks 18. A data cylinder includes a set of corresponding data tracks 42 for the data surfaces 20 in the data storage disk file 10. The data tracks 42 include a plurality of segments or data sectors 44, each for containing a predefined size of individual groups of data records which are saved for later retrieval and updates.

Figure 2:
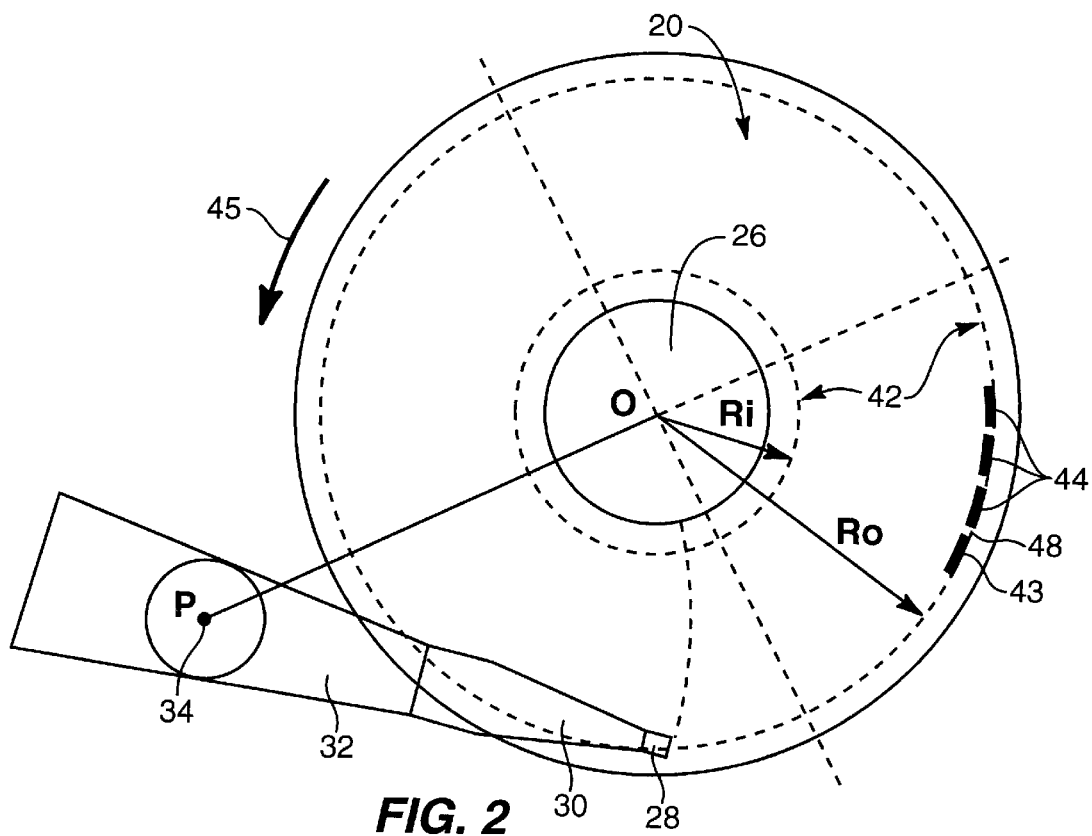
FIG. 2 is a top view of the direct access storage device of FIG. 1.

The data information tracks 42 are disposed at predetermined positions relative to a servo reference index. In FIG. 2, one sector 43 comprises SECTOR 0 with a fixed index or mark INDEX for properly locating the first data sector. The location of each next sector 44 is identified by a sector identification signal (SID) 48 read by the transducer heads 28 from the surfaces 20.

Figure 3:
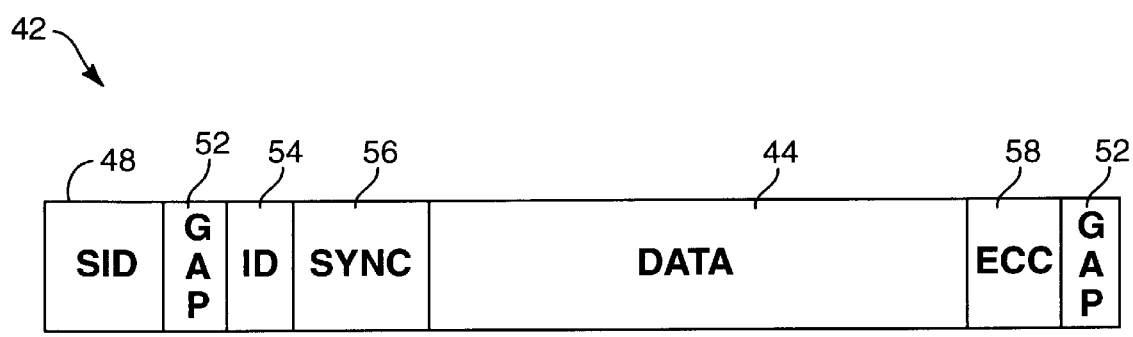
FIG. 3 is a graph illustrating AC and DC tangential misalignment.

FIG. 3 shows one arrangement of a sector 44 of a data track 42. As shown in FIG. 3, the sector 44 includes SID marks 48, gaps 52, an index or ID portion 54, a data portion 50, and error correcting codes 58. The sectors are repeated a fixed number of times within each track 42. In the depicted embodiment, for example, 96 such sectors are formed in each track 42.

Figure 4:
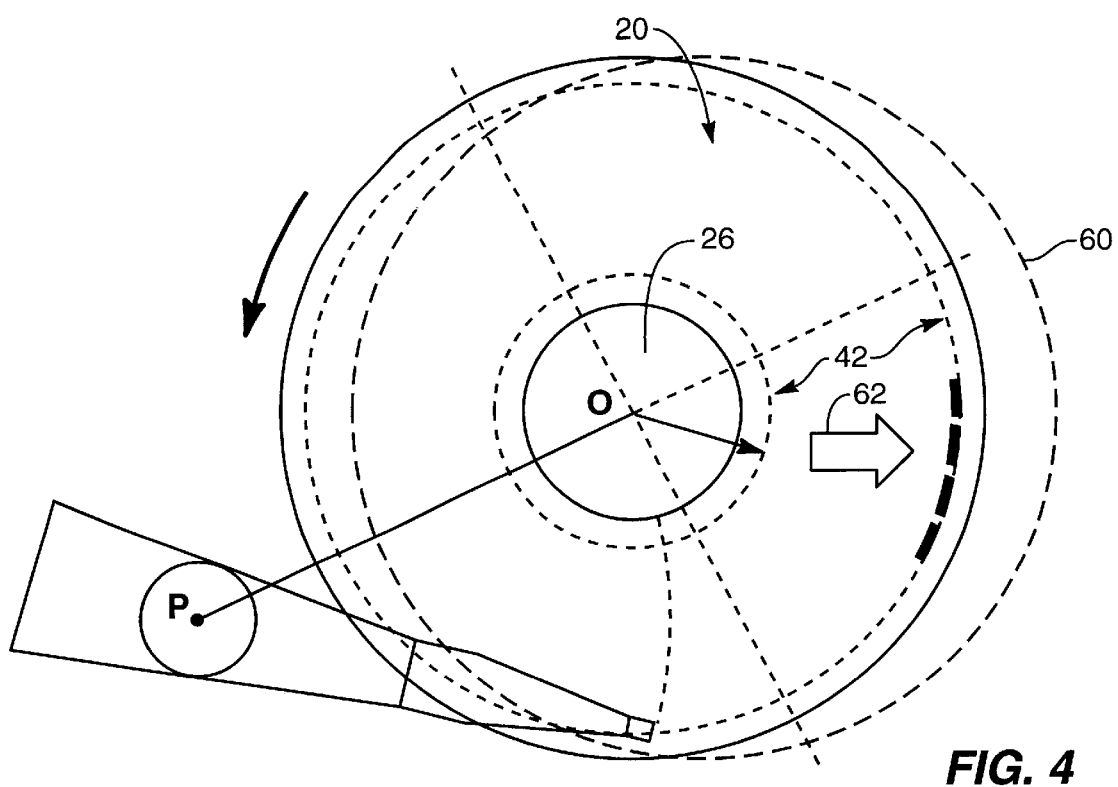
FIG. 4 is a top view of a direct access storage device showing tangential misalignment of a storage surface of the direct access storage device.
Figure 5:
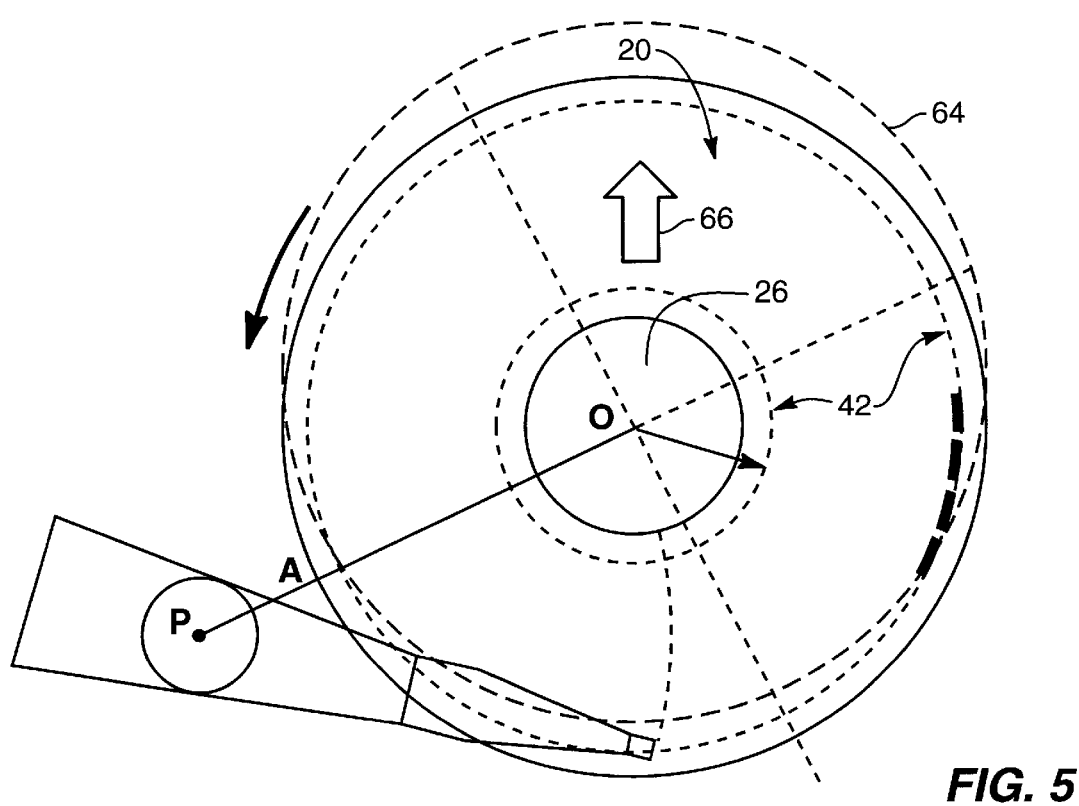
FIG. 5 is a top view of a direct access storage device showing radial misalignment of a storage surface of the direct access storage device.

FIGS. 4 and 5 illustrate the differences between misalignment in the radial and tangential directions. The depicted misalignment is exaggerated for illustration purposes. In FIG. 4, the actual location 60 is offset from the reference location 20 in a tangential direction 62. In FIG. 5, the actual location 64 is offset from the reference location 20 in a radial direction 66. Of course, actual misalignment often occurs in a direction that is a combination of the tangential direction 62 and the radial direction 66.

Figure 6:
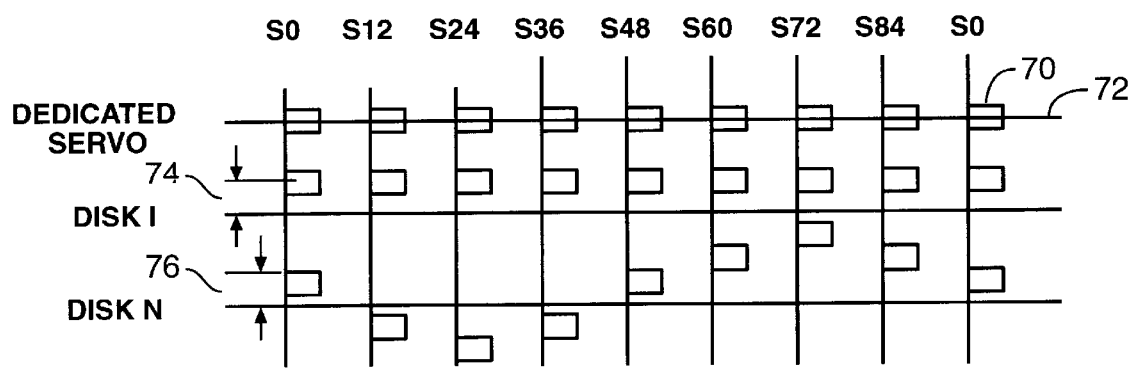
FIG. 6 is a schematic block diagram illustrating the contents of one embodiment of a data track of the direct access storage device of FIGS. 1 and 2.

The result of misalignment in the tangential direction 62 is that the SID marks 48 of FIG. 3 do not occur when expected. The misalignment occurs in two forms, shown in FIG. 6. FIG. 6 is a chart showing a centerline 70 of a data track 42 and the actual sensing of SID marks 72 in time relative to the centerline 70. A Disk 0 is shown to be aligned, such that the sensing of the SID marks 72 coincides with the reference track 70. In a Disk 1, a constant, or DC misalignment between the SID marks and the data track is shown, and in a Disk N, a varying or AC misalignment is shown varying periodically with a frequency corresponding to the speed of revolution of the storage surface 20.

In order to read data on tracks with misaligned SID marks, and in general to precompensate for tangential misalignment, the present invention comprises a modification of the programming control unit 14 of FIG. 1. The control unit, in addition to compensating for radial misalignment as is currently common among disk drives, is also modified to precompensate for tangential misalignment. In one embodiment, the control unit 14 is modified to include a tangential misalignment precompensation module 80 of FIG. 7. The tangential misalignment precompensation module 80 can be programmed into memory for execution as when the control unit 14 comprises a microprocessor. Alternatively, the tangential misalignment precompensation module 80 may be part of a hardwired solution or may be incorporated into a programmed logic device, all of which are collectively referred to herein as programming of the control unit 14.

Figure 7:
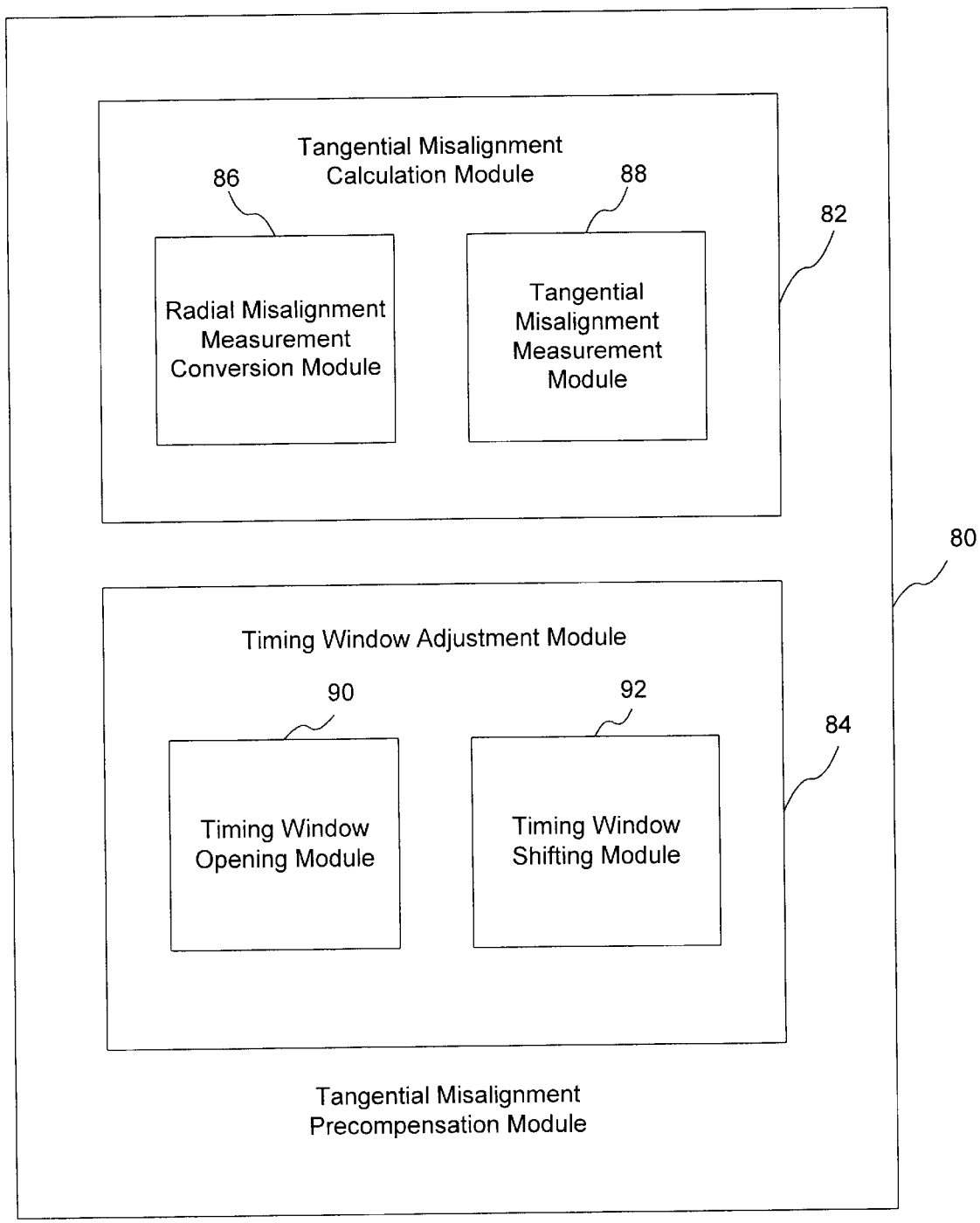
FIG. 7 is a schematic block diagram illustrating one embodiment of modules for operation within a control unit of the direct access storage device of FIGS. 1 and 2 in accordance with certain embodiments of the apparatus of the present invention.

The tangential misalignment precompensation module 80 of FIG. 7 is shown comprising a tangential misalignment calculation module 82 and a timing window adjustment module 84. The tangential misalignment calculation module 82 is preferably configured to calculate the repeatable tangential misalignment, in both its AC and DC components. This calculation may be conducted in any manner, but is preferably conducted either by a radial misalignment measurement conversion module 86, or a tangential misalignment measurement module 88.

The radial misalignment measurement conversion module 86 is configured to receive a radial misalignment measurement, preferably a measurement calculated in the course of compensating for radial misalignment, and convert that measurement into a calculation of tangential misalignment. For instance, the calculation of tangential misalignment may be the product of a trigonometric equation, as will be discussed in more detail below.

The tangential misalignment measurement module 88 is configured to directly measure the tangential misalignment in any suitable manner, examples of which will be given below. The tangential misalignment measurement module 88 is an alternative to the radial misalignment measurement conversion module 86, but nevertheless, both are shown together because both are suitable for use in different embodiments of the present invention.

The timing window adjustment module 84 is configured to receive the tangential misalignment calculation generated by the tangential misalignment calculation module and correspondingly adjust a SID timing window. The SID timing window may be adjusted in any suitable manner to precompensate for tangential misalignment in accordance with the received measurement, but two manners are preferred, as represented by the timing window opening module 90 and the timing window shifting module 92. The timing window opening module 90 and the timing window shifting module 92 are alternatives to each other, and generally one or the other is employed in a disk drive unit 10, but of course, both could be used in the same disk drive unit 10.

The timing window opening module 90 is configured to increase the period of time for which the SID timing window which is opened to read the SID marks 48. An advantage of the timing window opening module 90 is that the widening of the timing window can be conducted on a case by case basis, either by track 42, by surface 20, or by disk drive unit 10. Thus, each disk drive unit 10 or component thereof operates with a minimum allowable window opening and correspondingly, a maximum speed and efficiency.

The timing window shifting module 92 is configured to receive the tangential misalignment measurement from the tangential misalignment calculation module 82 and to use this information to shift the timing window in time, rather than opening the window wider. The width of the timing window is thereby fixed, and the beginning of the window is a variable set in time relative to some constant. This variable is modified by the measurement received from the module 82 to either be ahead or behind an initial reference setting by an appropriate amount, corresponding to the tangential misalignment of the particular track 42, surface 20, or disk drive unit 10. Thus, the shifting of the timing window is preferably conducted on a case by case basis, whether by track 42, surface 20, or disk drive unit 10.

The processes 100, 120, 140, and 160 of FIGS. 8 through 11 represent preferred manners of operation of the radial misalignment measurement conversion module 86, the tangential misalignment measurement module 88, the timing window opening module 90, and the timing window shifting module 92, respectively.

Figure 8:
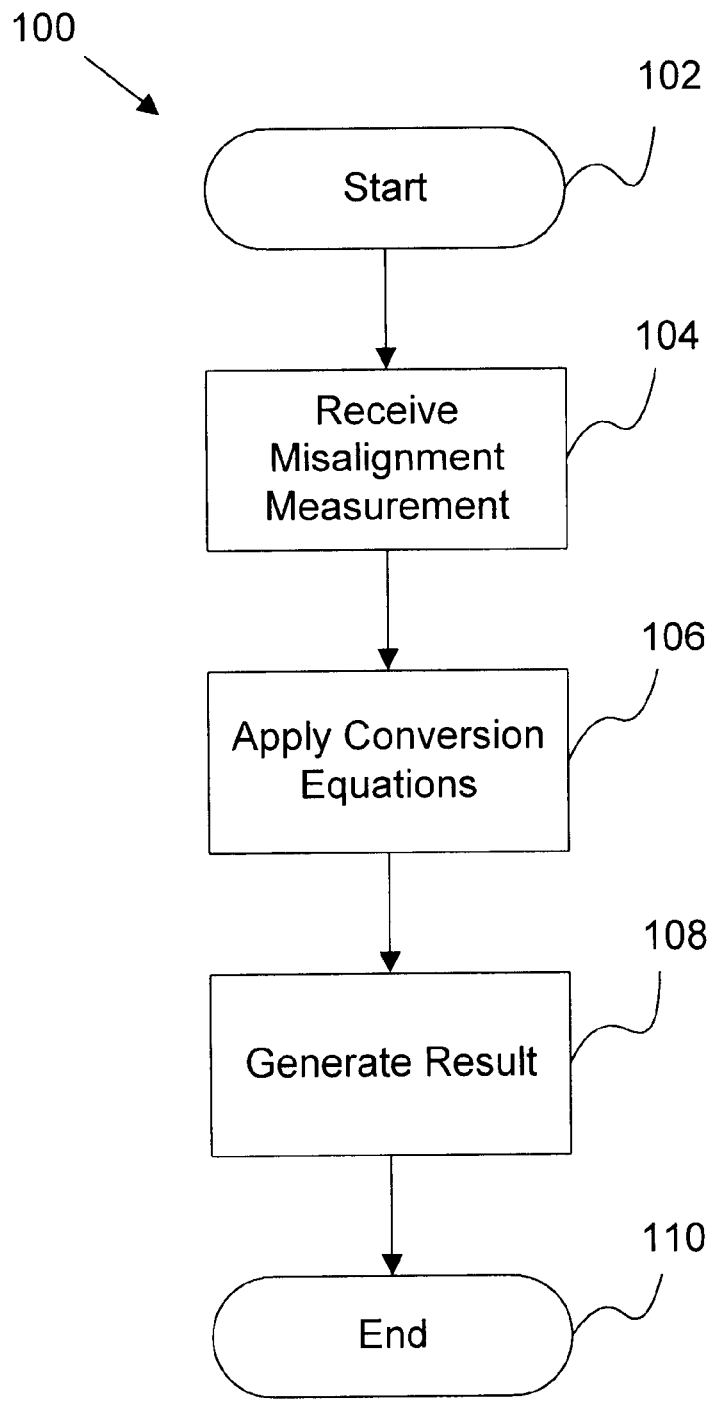
FIGS. 8 through 11 are flow chart diagrams illustrating the operation of selected modules of FIG. 7 in accordance with certain embodiments of the method of the present invention.

The process 100 of FIG. 8 illustrates one manner of operation of the radial misalignment measurement conversion module 86. The process 100, as represented by FIG. 8, begins at a step 102. At a step 104, the radial misalignment measurement conversion module 86 preferably receives a rotational misalignment measurement. The rotational misalignment measurement is preferably received from other modules of the control unit 14 which are configured to compensate for radial misalignment as is commonly known in the art.

When a constant or DC portion of a track shift occurs, the effective center of rotation of the disk and the effective center of rotation of the actuator shift their relative locations after the SIDs have been written on the disk. In this case there is no set relation between the tangential shift and the radial shift, and the shifts can be determined only by direct measurement. The radial shift is determined by observing the apparent shift in radial position of the head during a head switch. The tangential shift is measured taking the difference in time between the expected occurrence of the SID and the actual observed occurrence of the SID.

When a periodic or AC portion of the track shift occurs, the disk (and hence the tracks) shifts relative to the spindle center of rotation. In this case the tangential disk shift can be calculated from the measured radial disk shift, and the amount of shift in units of time is (radial shift/circumference of track)*(Period of revolution). The tangential disk shift is delayed one quarter revolution from the measured radial shift. If the head moved on a radial line, the tangential shift would be delayed from the measured radial shift the same amount for all tracks. However, in a typical file with a rotary actuator, the head does not move on a radial line, but rather on an arc that is determined by fly geometry. Consequently once AC tangential disk shift is acquired for one track, the AC tangential disk shift can be converted for other tracks according to the geometry of the file with the formula:

$$addshift(r1, r2, lc, l) = \frac{r1\left(\arccos\left(\frac{r1^2 + lc^2 - l^2}{2r1^2 lc^2}\right) - \arccos\left(\frac{r2^2 + lc^2 - l^2}{2r2^2 lc^2}\right)\right)}{2r1\pi} t \quad \text{(Equation 2)}$$

where r1 and r2 are the radii of the two tracks, l is the length from the pivot center to the head, and lc is the distance from the actuator center to the center of the track, and addshift is the change in delay in time. Thus, the shift in time of the SID at track two is (T/4)–addshift.

In one embodiment, the radial misalignment measurements are stored in a RRO table, and the process 100 requests and receives the measurements from the RRO table. At a step 106, the process 100 involves applying a conversion equation to convert the radial misalignment data into tangential misalignment data. In one embodiment, this equation comprises:

$$TMS(r, TMR, t) = \left(\frac{TMR(t - T/4)}{2\pi r}\right) T \quad \text{(Equation 1)}$$

where TMR is the measured radial shift, t is the time at which the measurement is taken, T is the period of rotation, and r is the nominal radius of the track. Once the tangential shift is acquired for a single track, the tangential shift for other tracks can be calculated using Equation 2.

At a step 108, the result of the above equation is returned and may be immediately applied, e.g., received by the timing window adjustment module, or stored in a table, such as part of the RRO table and used when required. The result may be stored for a single track of each disk and the results extrapolated for the other tracks according to the distance away from the reference track.

Thus, when applying the process 100 on-the-fly, the result would be returned 108, and the process 100 would terminate at a step 112. When generating tangential misalignment data for an entire data track 42, the process 100 loops 110 for each SID mark 48 in the data track 42. In this embodiment, the process 100 is applied at the first reading of a data track 42 and again at intervals either regular or more frequently when it is determined that the tangential misalignment is rapidly fluctuating.

Figure 9:
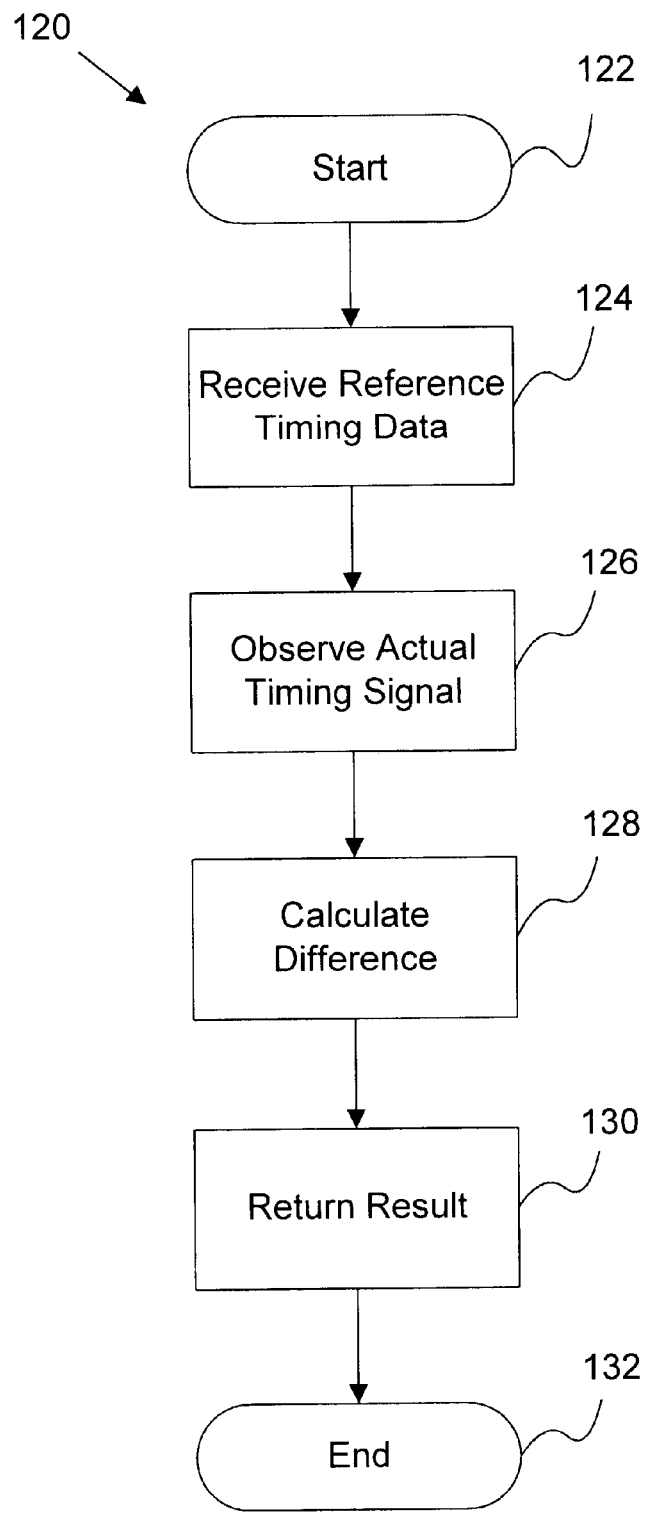

FIG. 9 is a flow chart block diagram illustrating one manner of operation of the tangential misalignment measurement module 88. FIG. 9 shows a process 120 which begins at a start step 122. At a step 124, the process 120 receives reference timing data. In one embodiment, the reference timing data comprises a stored variable indicating the expected timing of a SID mark 48.

At a step 126, the timing of the actual sensing of the SID mark 48 is observed and noted. At a step 128, the difference between the reference timing data and the actual sensing of the SID mark 48 is calculated. At a step 130, the result is returned and may be applied as discussed above, or stored. The process 120 may be applied on-the-fly, or conducted by looping 132 for every SID mark 48 in a track 42. The tangential misalignment measurement data so procured may recorded, as discussed above, in a suitable storage location such as in the RRO table or passed to the timing window adjustment module 84.

Figure 10:
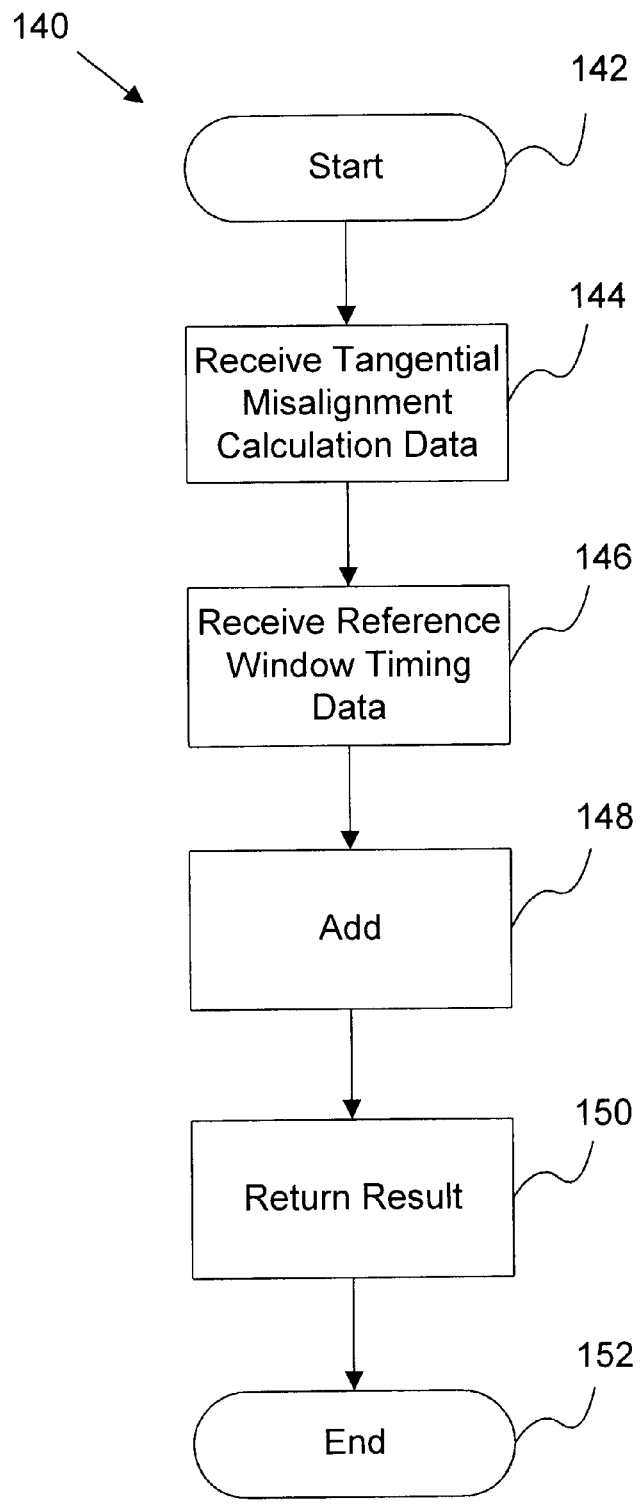

FIG. 10 is a flow chart block diagram illustrating one manner of operation of the timing window opening module 90. FIG. 10 shows a process 140 which begins at a start step 142. At a step 144, the process 140 receives tangential misalignment calculation data, preferably from either the radial misalignment measurement conversion module 86 using the process 100 of FIG. 8, or the tangential misalignment measurement module 88 using the process 120 of FIG. 9.

At a step 146, the process 140 receives reference window timing data. The reference window timing data, as described above, may comprise a variable stored in memory referencing locations of the SID marks 48 on the storage surface 20, or may comprise a reference surface or reference marks on the storage surface 20. Preferably, the reference window timing data is received by memory or a buffer of the control unit 14 and stored.

At a step 148, the reference window timing data is compared to the tangential misalignment calculation data to determine whether the tangential misalignment is over a predetermined value such that it falls out of the current window opening. At a step 150, the process 140 checks the predetermined value and if the tangential misalignment is greater than the predetermined value, proceeds to step 152 where the window is opened an amount of time in accordance with the measurement to allow the SID marks to be read within the window. The AC and DC components of the tangential misalignment may be adjusted together or separately. If the tangential misalignment is not greater than the predetermined value, the process proceeds on and ends at step 156 or loops 172 to the start.

The process 140 can be conducted on-the-fly, as discussed above, operating and precompensating for every SID mark 48 as it arrives under the transducer head 28, or more preferably, can be conducted at intervals, and precompensation information for all the SID marks 48 and stored in a table such as the RRO table. Thus, if the process 140 is being conducted on-the-fly, the program would terminate after step 152 to be resumed for the next SID mark 48. If the process 140 is being conducted for an entire track 42, the process loops 154 until window timing information for all SID marks 48 in the track 42 has been generated and stored.

When precompensation information has thus been generated for a given track, it may then at a step 156 be converted for each subsequent track on the storage surface 20 using common trigonometric principles. Once again, the calculation for subsequent tracks may be calculated as needed, or calculated periodically and stored needed. When the precompensation information is stored in a table, it is referenced for every track switch and for every head switch. The process 140 ends at a step 158.

Figure 11:
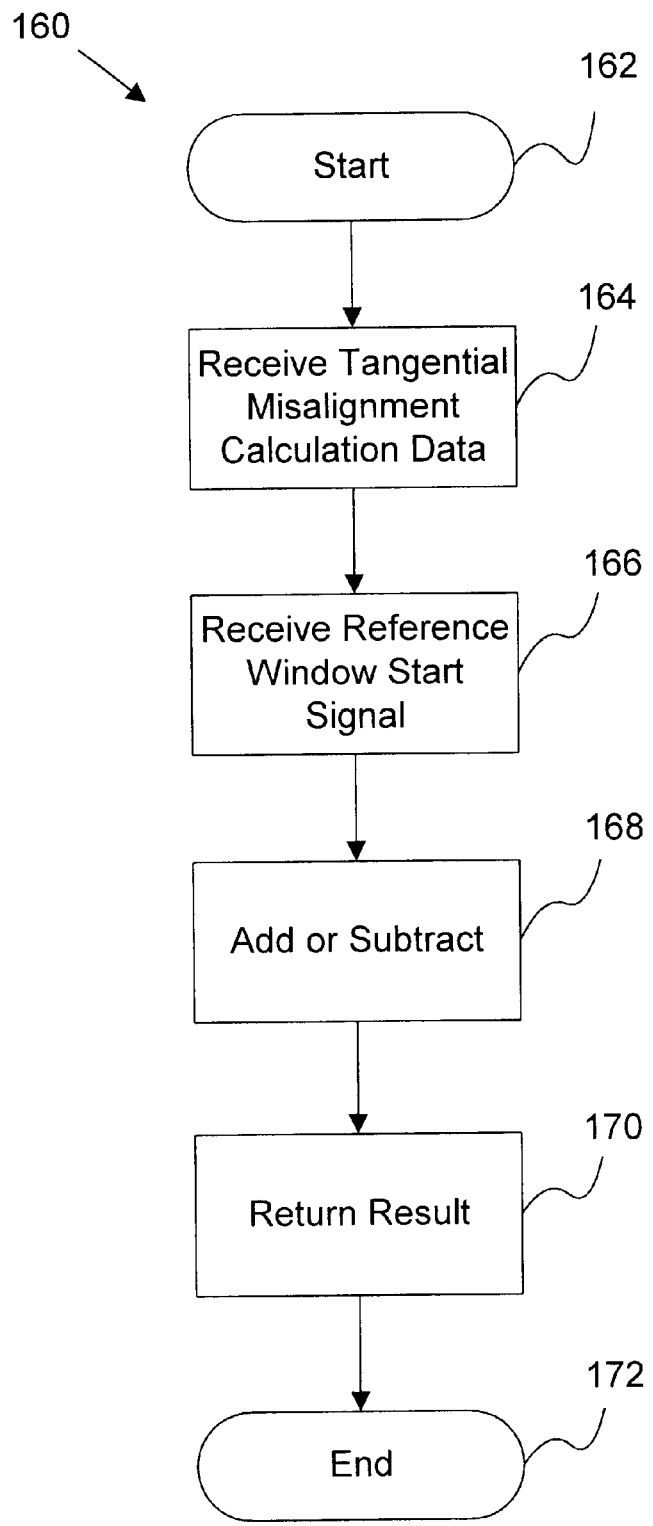

FIG. 11 is a flow chart block diagram illustrating one manner of operation of the timing window shifting module 92. FIG. 11 shows a process 160 which begins at a start step 162. At a step 164, the process 160 receives tangential misalignment calculation data. As with the process 140, the tangential misalignment calculation data is preferably generated by either the radial misalignment measurement conversion module 86 using the process 100 of FIG. 8, or the tangential misalignment measurement module 88 using the process 120 of FIG. 9.

At a step 166, the process 160 receives reference window start data. The reference window start data preferably comprises a variable stored in a buffer or memory referencing the timing of the opening of the SID timing window for one or more SID marks 48 on a track 42 being read or written to by the transducer head 28. Preferably, the reference window timing data is received by memory or a buffer of the control unit 14 and stored. In this embodiment, the SID timing window is open for a constant amount of time.

At a step 168, the reference window start data is compared to the tangential misalignment calculation data to determine whether the tangential misalignment is greater than a predetermined value such that the SID mark 48 cannot be read within the current SID timing window. At a step 170, the process 140 checks the predetermined value, and if the tangential misalignment is greater than the predetermined value, proceeds to a step 172 where the start time of the timing window is shifted in time, either forward or backward. The timing window is shifted an amount in accordance with the measurement to allow the SID mark 48 to be safely read within the timing window. The AC and DC components of the tangential misalignment may be adjusted together or separately. If the tangential misalignment is not greater than the predetermined value, the process proceeds on and ends at step 176 or loops 174 to the start.

The process 160, similar to the process 140, can be conducted on-the-fly, as discussed above, operating and precompensating for every SID mark 48 as it arrives under the transducer head 28, or more preferably, can be conducted at intervals, and precompensation information for all the SID marks 48 and stored in a table such as the RRO table. Thus, if the process 160 is conducted on-the-fly, the process 140 terminates after step 172 to be resumed for the next SID mark 48. If the process 160 is being conducted for an entire track 42, the process 160 loops 174 until window start timing information for all SID marks 48 in the track 42 has been generated and stored.

When precompensation information has thus been generated for a given track, it may then at a step 176 be converted for each subsequent track on the storage surface 20 using common trigonometric principles. Once again, the calculation for subsequent tracks may be calculated as needed, or calculated periodically and stored until needed. When the precompensation information is stored in a table, it is referenced for every track switch and for every head switch. The process 160 ends at a step 178.

The processes 140 and 160 are considered to be alternatives to each other, but of course, both could be used within a disk drive unit 10 if desired. The processes 140 and 160 can either be conducted for every SID mark 48, or for every track 42, surface 20, disk 18, or drive 10. When conducted for an entire track, surface, disk, or drive, the processes 140, 160 are preferably conducted periodically as needed, and more frequently if the tangential misalignment measurement is determined to be fluctuating rapidly.

By using the tangential misalignment precompensation apparatus and method of the present invention, fewer error conditions will occur, as SID marks will be read when expected, and the disk drive unit 10 will not be required to go into error recovery mode. The speed and reliability of the direct access storage device is thus increased. Additional speed increases may also result, because the adjustments to the SID timing window are calculated on a case by case basis, rather than once for an entire drive or production run of drives.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of precompensating for tangential misalignment in a direct access storage device having information located on a storage surface and having a transducer head for reading the information, the method comprising:
   generating a calculation of tangential misalignment of the transducer head with respect to the information located on the storage surface; and
   adjusting, in accordance with the calculation of tangential misalignment, a timing window during which the transducer head reads the information located on the storage surface.

2. The method of claim 1, wherein generating a calculation of tangential misalignment comprises converting a radial misregistration measurement into the tangential misalignment calculation.

3. The method of claim 2, wherein converting a radial misregistration measurement into the tangential misalignment calculation comprises converting the radial misregistration measurement to the calculation of tangential misalignment with an equation comprising:

$$TMS(r, TMR, t) = \left(\frac{TMR(t - T/4)}{2\pi r}\right)T$$

where TMR is the measured radial shift, t is the time at which the measurement is taken, T is the period of rotation, and r is the nominal radius of the track.

4. The method of claim 1, wherein generating a calculation of tangential misalignment comprises measuring the tangential misalignment.

5. The method of claim 4, wherein measuring the tangential misalignment comprises measuring a difference between the time of a predicted occurrence of sensing the information located on the storage surface and the time of an actual occurrence of sensing the information located on the storage surface.

6. The method of claim 5, wherein the information located on the storage surface comprises servo identification (SID) signals distributed within tracks on a storage surface of the direct access storage device.

7. The method of claim 1, wherein adjusting the timing window comprises widening the timing window to accommodate tangential misalignment of the direct access storage device.

8. The method of claim 1, wherein adjusting the timing window comprises shifting the timing window in time to accommodate tangential misalignment of the direct access storage device.

9. The method of claim 1, wherein the data stored on the storage surface comprises servo identification (SID) signals placed on the storage surface during manufacture of the direct access storage drive for locating the transducer head in a desired location during read and write operations.

10. The method of claim 1, wherein generating a calculation of tangential misalignment comprises calculating a DC component of tangential misalignment and calculating an AC component of tangential misalignment, and wherein adjusting, in accordance with the calculation of tangential misalignment, a timing window comprises adjusting separately the DC component and the AC component.

11. An apparatus for precompensating for tangential misalignment in a direct access storage device having information located on a storage surface and having a transducer head for reading the information, the apparatus comprising:
   a control unit comprising:
      a tangential misalignment calculation module configured to generate a calculation of tangential misalignment of the transducer head with respect to the information located on the storage surface; and
      a timing window adjustment module configured to receive the calculation of tangential misalignment and adjust, in accordance with the calculation of tangential misalignment, a timing window during which the transducer head reads the information located on the storage surface.

12. The apparatus of claim 11, wherein the tangential misalignment calculation module comprises a radial misalignment measurement conversion module configured to convert a radial misalignment measurement into the tangential misalignment calculation.

13. The apparatus of claim 12, wherein radial misalignment measurement conversion module is configured to convert the radial misregistration measurement to the calculation of tangential misalignment with an equation comprising:

$$TMS(r, TMR, t) = \left(\frac{TMR(t - T/4)}{2\pi r}\right)T$$

where TMR is the measured radial shift, t is the time at which the measurement is taken, T is the period of rotation, and r is the nominal radius of the track.

14. The apparatus of claim 11, wherein the tangential misalignment calculation module comprises a tangential misalignment measurement module adapted to measure tangential misalignment.

15. The apparatus of claim 14, wherein the tangential misalignment measurement module is configured to measure a difference between the time of a predicted occurrence of sensing the information located on the storage surface and the time of an actual occurrence of sensing the information located on the storage surface.

16. The apparatus of claim 15, wherein the information located on the storage surface comprises servo identification (SID) signals distributed within tracks on a storage surface of the direct access storage device.

17. The apparatus of claim 11, wherein the timing window adjustment module comprises a timing window opening module configured to widen the timing window to accommodate tangential misalignment of the direct access storage device.

18. The apparatus of claim 11, wherein the timing window adjustment module comprises a timing window shifting module configured to shift the timing window in time to accommodate tangential misalignment of the direct access storage device.

19. The apparatus of claim 11, wherein the data stored on the storage surface comprises servo identification (SID) signals placed on the storage surface during manufacture of the direct access storage drive for locating the transducer head in a desired location during read and write operations.

20. The apparatus of claim 11, wherein the tangential misalignment calculation module is configured to calculate a DC component of tangential misalignment and to calculate an AC component of tangential misalignment, and wherein the timing window adjustment module is configured to adjust separately the DC component and the AC component.

21. A direct access storage drive, comprising:
   a magnetic recording disk, the magnetic recording disk having magnetically recorded data stored thereon and servo identification (SID) marks also stored thereon identifying the locations in which the magnetically recorded data are stored;

a transducer head for reading and writing the magnetically recorded data stored on the magnetic recording disk;

an actuator for moving the transducer head across the magnetic recording disk to access different regions of the magnetically recorded data on the magnetic recording disk;

a detector electrically coupled to the transducer head for detecting the magnetically recorded data; and a control unit comprising:

a tangential misalignment calculation module configured to generate a calculation of tangential misalignment of the transducer head with respect to information located on a storage surface of the magnetic recording disk; and a timing window adjustment module configured to receive the calculation of tangential misalignment and adjust, in accordance with the calculation of tangential misalignment, a timing window during which the transducer head reads the information located on the storage surface.

22. The direct access storage drive of claim 21, wherein the tangential misalignment calculation module comprises a radial misalignment measurement conversion module for converting a radial misalignment measurement into the tangential misalignment calculation.

23. The direct access storage drive of claim 22, wherein the radial misalignment measurement conversion module is configured to convert the radial misregistration measurement to the calculation of tangential misalignment with an equation comprising:

$$TMS(r, TMR, t) = \left(\frac{TMR(t - T/4)}{2\pi r}\right)T$$

where TMR is the measured radial shift, t is the time at which the measurement is taken, T is the period of rotation, and r is the nominal radius of the track.

24. The direct access storage drive of claim 21, wherein the tangential misalignment calculation module comprises a tangential misalignment measurement module configured to measure tangential misalignment.

25. The direct access storage drive of claim 24, wherein the tangential misalignment measurement module is configured to measure a difference between the time of a predicted occurrence of sensing the information located on the storage surface and the time of an actual occurrence of sensing the information located on the storage surface.

26. The direct access storage drive of claim 25, wherein the information located on the storage surface comprises servo identification (SID) signals distributed within tracks on the storage surface.

27. The direct access storage drive of claim 21, wherein the timing window adjustment module comprises a timing window opening module configured to widen the timing window to accommodate tangential misalignment of the direct access storage device.

28. The direct access storage drive of claim 21, wherein the timing window adjustment module comprises a timing window shifting module configured to shift the timing window in time to accommodate tangential misalignment of the direct access storage device.

29. The direct access storage drive of claim 21, wherein the data stored on the storage surface comprises servo identification (SID) signals placed on the storage surface during manufacture of the direct access storage drive for locating the transducer head in a desired location during read and write operations.

30. The direct access storage drive of claim 21, wherein the tangential misalignment calculation module is configured to calculate a DC component of tangential misalignment and to calculate an AC component of tangential misalignment, and wherein the timing window adjustment module is configured to adjust separately the DC component and the AC component.

\* \* \* \* \*

UNITED STATES PATENT AND TRADEMARK OFFICE
CERTIFICATE OF CORRECTION

PATENT NO.   : 6,577,463 B1
DATED        : June 10, 2003
INVENTOR(S)  : Frees et al.

It is certified that error appears in the above-identified patent and that said Letters Patent is hereby corrected as shown below:

Drawings,
Figure 10, Box 148, "Add" should read -- Compare --.
Figure 10, Box 150, "Return Result" should read -- Adjust Window --.
Figure 11, Box 168, "Add or Subtract" should read -- Compare --.
Figure 11, Box 170, "Return Result" should read -- Adjust Window --.

Column 3,
Line 67, "recorded stored" should read -- recorded data stored --.

Column 5,
Line 51, "50," should read -- 44, --.

Column 8,
Line 41, "100 loops 110 for" should read -- 100 loops for --.
Line 60, "looping 132 for" should read -- looping for --.
Lines 61-62, "may recorded," should read -- may be recorded, --.

Column 9,
Line 21, "to step 152" should read -- to --.
Line 22, "where the window is opened" should read -- open the window --.
Line 28, "step 156 or loops 172 to" should read -- step 152 or loops to --.
Line 38, "loops 154 until" should read -- loops until --.
Line 41, "then at a step 156 be" should read -- then be --.
Line 45, "stored needed." should read -- stored when needed. --.
Line 48, "a step 158." should read -- a step 152. --.

Column 10,
Line 8, "step 172 where the start" should read -- shift start --.
Line 9, "window is shifted in" should read -- window in --.
Line 16, "step 176 or loops 174 to" should read -- step 172 or loops to --.
Line 27, "loops 174 until" should read -- loops until --.
Line 31, "then at a step 176 be" should read -- then be --.

UNITED STATES PATENT AND TRADEMARK OFFICE
CERTIFICATE OF CORRECTION

PATENT NO. : 6,577,463 B1
DATED : June 10, 2003
INVENTOR(S) : Frees et al.

It is certified that error appears in the above-identified patent and that said Letters Patent is hereby corrected as shown below:

<u>Column 10 (cont'd)</u>,
Line 39, "step 178." should read -- step 172. --.

Signed and Sealed this

Thirtieth Day of December, 2003

JAMES E. ROGAN
*Director of the United States Patent and Trademark Office*